US007257676B2

(12) United States Patent
Corbett et al.

(10) Patent No.: US 7,257,676 B2
(45) Date of Patent: *Aug. 14, 2007

(54) SEMI-STATIC DISTRIBUTION TECHNIQUE

(75) Inventors: Peter F. Corbett, Lexington, MA (US); Steven R. Kleiman, Los Altos, CA (US); Robert M. English, Menlo Park, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/633,900

(22) Filed: Dec. 5, 2006

(65) Prior Publication Data

US 2007/0083710 A1    Apr. 12, 2007

Related U.S. Application Data

(63) Continuation of application No. 10/720,364, filed on Nov. 24, 2003, now Pat. No. 7,185,144.

(51) Int. Cl.
*G06F 12/00* (2006.01)
*G06F 11/00* (2006.01)

(52) U.S. Cl. .............................. 711/114; 711/170; 714/7
(58) Field of Classification Search .................... None
See application file for complete search history.

(56) References Cited

U.S. PATENT DOCUMENTS 5,615,352 A * 3/1997 Jacobson et al. ............ 711/114
6,000,010 A * 12/1999 Legg .......................... 711/114

* cited by examiner

*Primary Examiner*—Reginald Bragdon
*Assistant Examiner*—Mehdi Namazi
(74) *Attorney, Agent, or Firm*—Cesari & McKenna, LLP (57) ABSTRACT

A semi-static distribution technique distributes parity across disks of an array. According to the technique, parity is distributed (assigned) across the disks of the array in a manner that maintains a fixed pattern of parity blocks among the stripes of the disks. When one or more disks are added to the array, the semi-static technique redistributes parity in a way that does not require recalculation of parity or moving of any data blocks. Notably, the parity information is not actually moved; the technique merely involves a change in the assignment (or reservation) for some of the parity blocks of each pre-existing disk to the newly added disk.

20 Claims, 4 Drawing Sheets

| GROUP SIZE | REPEAT INTERVAL |
|---|---|
| 2 | 2 |
| 3 | 6 |
| 4 | 12 |
| 5 | 60 |
| 6 | 60 |
| 7 | 420 |
| 8 | 840 |
| 9 | 2,520 |

| GROUP SIZE | REPEAT INTERVAL |
|---|---|
| 10 | 2,520 |
| 11 | 27,720 |
| 12 | 27,720 |
| 13 | 360,360 |
| 14 | 360,360 |
| 15 | 360,360 |
| 16 | 720,720 |
| 17 | 12,252,240 |

FIG. 4

SEMI-STATIC DISTRIBUTION TECHNIQUE

RELATED APPLICATIONS

This application is a continuation of U.S. Ser. No. 10/720,364, now issued as U.S. Pat. No. 7,185,144, on Feb. 27, 2007, filed on Nov. 24, 2003 by Peter F. Corbett et al.

BACKGROUND OF THE INVENTION

1. Field of the Invention

The present invention relates to arrays of storage systems and, more specifically, to a system that efficiently assigns parity blocks within storage devices of a storage array.

2. Background Information

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" that comprises a cluster of physical disks, defining an overall logical arrangement of disk space. The disks within a volume are typically organized as one or more groups, wherein each group is operated as a Redundant Array of Independent (or Inexpensive) Disks (RAID). In this context, a RAID group is defined as a number of disks and an address/block space associated with those disks. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a file system to logically organize the information as a hierarchical structure of directories, files and blocks on the disks. For example, each "on-disk" file may be implemented as set of data structures, i.e., disk blocks, configured to store information, such as the actual data for the file. The storage operating system may also implement a RAID system that manages the storage and retrieval of the information to and from the disks in accordance with write and read operations. There is typically a one-to-one mapping between the information is stored on the disks in, e.g., a disk block number space, and the information organized by the file system in, e.g., volume block number space.

A common type of file system is a "write in-place" file system, an example of which is the conventional Berkeley fast file system. In a write in-place file system, the locations of the data structures, such as data blocks, on disk are typically fixed. Changes to the data blocks are made "in-place"; if an update to a file extends the quantity of data for the file, an additional data block is allocated. Another type of file system is a write-anywhere file system that does not overwrite data on disks. If a data block on disk is retrieved (read) from disk into a memory of the storage system and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

Most RAID implementations enhance the reliability/integrity of data storage through the redundant writing of data "stripes" across a given number of physical disks in the RAID group, and the appropriate storing of redundant information with respect to the striped data. The redundant information, e.g., parity information, enables recovery of data lost when a disk fails. A parity value may be computed by summing (usually modulo 2) data of a particular word size (usually one bit) across a number of similar disks holding different data and then storing the results on an additional similar disk. That is, parity may be computed on vectors 1bit wide, composed of bits in corresponding positions on each of the disks. When computed on vectors 1bit wide, the parity can be either the computed sum or its complement; these are referred to as even and odd parity respectively. Addition and subtraction on 1bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block contains data ("data blocks"), while the one block contains parity ("parity block") computed by the XOR of all the data.

As used herein, the term "encoding" means the computation of a redundancy value over a predetermined subset of data blocks, whereas the term "decoding" means the reconstruction of a data or parity block by the same process as the redundancy computation using a subset of data blocks and redundancy values. If one disk fails in the parity group, the contents of that disk can be decoded (reconstructed) on a spare disk or disks by adding all the contents of the remaining data blocks and subtracting the result from the parity block. Since two's complement addition and subtraction over 1bit fields are both equivalent to XOR operations, this reconstruction consists of the XOR of all the surviving data and parity blocks. Similarly, if the parity disk is lost, it can be recomputed in the same way from the surviving data.

If the parity blocks are all stored on one disk, thereby providing a single disk that contains all (and only) parity information, a RAID-4 level implementation is provided. The RAID-4 implementation is conceptually the simplest form of advanced RAID (i.e., more than striping and mirroring) since it fixes the position of the parity information in each RAID group. In particular, a RAID-4 implementation provides protection from single disk errors with a single additional disk, while making it easy to incrementally add data disks to a RAID group.

If the parity blocks are contained within different disks in each stripe, in a rotating pattern, then the implementation is RAID-5. Most commercial implementations that use advanced RAID techniques use RAID-5 level implementations, which distribute the parity information. A motivation for choosing a RAID-5 implementation is that, for most static file systems, using a RAID-4 implementation would limit write throughput. Such static file systems tend to scatter write data across many stripes in the disk array, causing the parity disks to seek for each stripe written. However, a write-anywhere file system, such as the WAFL file system, does not have this issue since it concentrates write data on a few nearby stripes.

Use of a RAID-4 level implementation in a write-anywhere file system is a desirable way of allowing incremental capacity increase while retaining performance; however there are some "hidden" downsides. First, where all the disks in a RAID group are available for servicing read traffic in a RAID-5 implementation, one of the disks (the parity disk) does not participate in such traffic in the RAID-4 implementation. Although this effect is insignificant for large RAID group sizes, those group sizes have been decreasing because of, e.g., a limited number of available disks or increasing reconstruction times of larger disks. As disks continue to increase in size, smaller RAID group configurations become more attractive. But this increases the fraction of disks unavailable to service read operations in a RAID-4 configuration. The use of a RAID-4 level implementation may therefore result in significant loss of read operations per second. Second, when a new disk is added to a full volume, the write anywhere file system tends to direct most of the write data traffic to the new disk, which is where most of the free space is located.

The RAID system typically keeps track of allocated data in a RAID-5 level implementation of the disk array. To that end, the RAID system reserves parity blocks in a fixed pattern that is simple to compute and that allows efficient identification of the non-data (parity) blocks. However, adding new individual disks to a RAID group of a RAID-5 level implementation typically requires repositioning of the parity information across the old and new disks in each stripe of the array to maintain the fixed pattern. Repositioning of the parity information typically requires use of a complex (and costly) parity block redistribution scheme that "sweeps-through" the old and new disks, copying both parity and data blocks to conform to the new distribution. The parity redistribution scheme further requires a mechanism to identify which blocks contain data and to ensure, per stripe, that there are not too many data blocks allocated so that there is sufficient space for the parity information. As a result of the complexity and cost of such a scheme, most RAID-5 implementations relinquish the ability to add individual disks to a RAID group and, instead, use a fixed RAID group size (usually in the 4-8 disk range). Disk capacity is then increased a full RAID group at a time. Yet, the use of small RAID groups translates to high parity overhead, whereas the use of larger RAID groups means having a high-cost for incremental capacity.

Therefore, it is desirable to provide a distribution system that enables a storage system to distribute parity evenly, or nearly evenly, among disks of the system, while retaining the capability of incremental disk addition.

In addition, it is desirable to provide a distribution system that enables a write anywhere file system of a storage system to run with better performance in smaller (RAID group) configurations.

SUMMARY OF THE INVENTION

The present invention overcomes the disadvantages of the prior art by providing a semi-static distribution technique that distributes parity across disks of an array. According to an illustrative embodiment of the technique, parity is distributed (assigned) across the disks of the array in a manner that maintains a fixed pattern of parity blocks among stripes of the disks. When one or more disks are added to the array, the semi-static technique redistributes parity in a way that does not require recalculation of parity or moving of any data blocks. Notably, the parity information is not actually moved; the technique merely involves a change in the assignment (or reservation) for some of the parity blocks of each pre-existing disk to the newly added disk. For example, a pre-existing block that stored parity on, e.g., a first pre-existing disk, may continue to store parity; alternatively, a block on the newly added disk can be assigned to store parity for the stripe, which "frees up" the pre-existing parity block on the first disk to store file system data.

Advantageously, semi-static distribution allows those blocks that hold parity (in the stripe) to change when disks are added to the array. Reassignment occurs among blocks of a stripe to rebalance parity to avoid the case where a disk with a preponderance of parity gets "hot", i.e., more heavily utilized than other disks, during write traffic. The novel distribution technique applies to single disk failure correction and can be extended to apply to double (or greater) disk loss protection. In addition, the semi-static distribution technique has the potential to improve performance in disk-bound configurations while retaining the capability to add disks to a volume one or more disks at a time.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
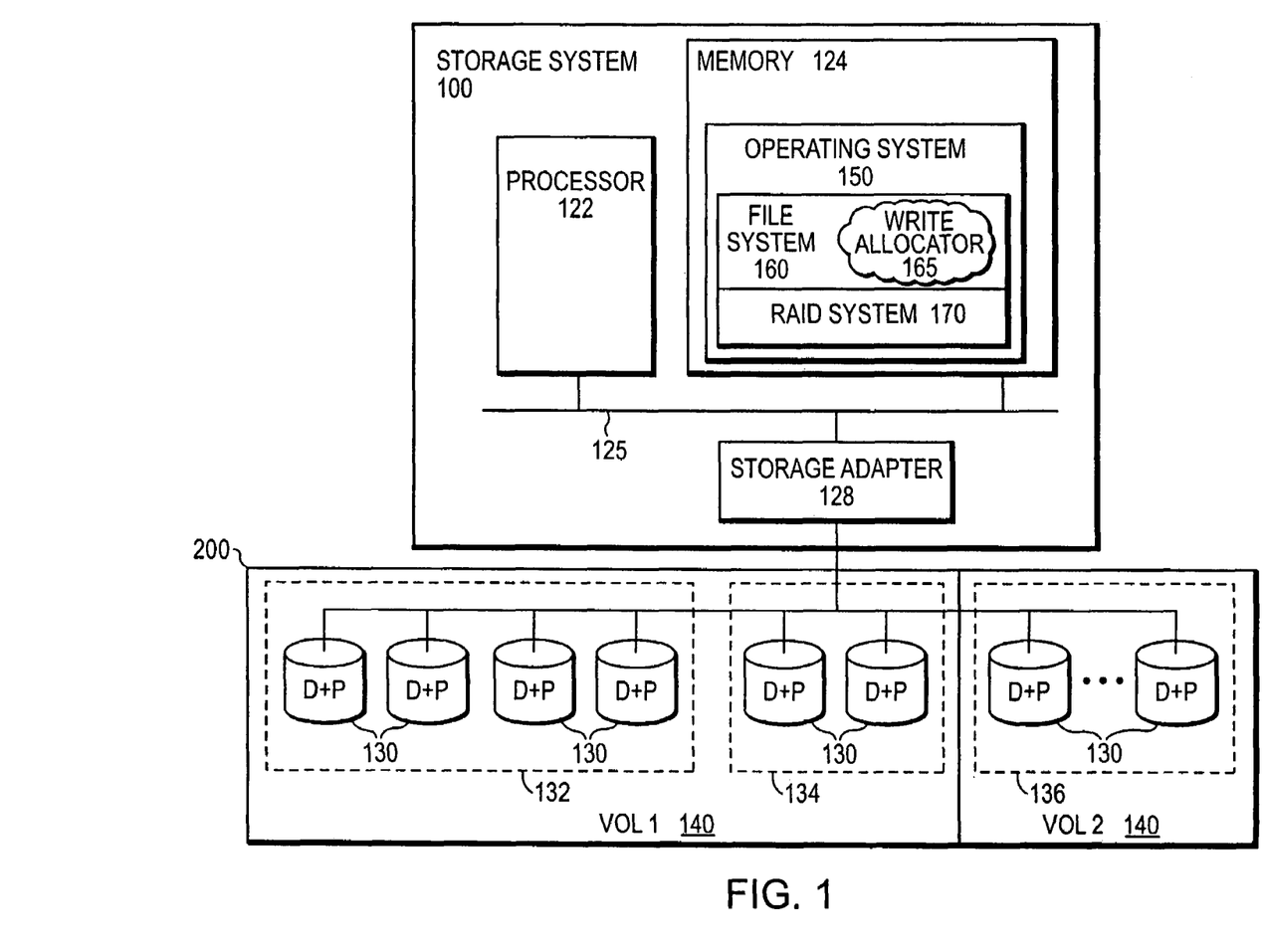
FIG. 1 is a schematic block diagram of a storage system that may be advantageously used with the present invention.

FIG. 1 is a schematic block diagram of a storage system 100 that may be advantageously used with the present invention. In the illustrative embodiment, the storage system 100 comprises a processor 122, a memory 124 and a storage adapter 128 interconnected by a system bus 125. The memory 124 comprises storage locations that are addressable by the processor and adapter for storing software program code and data structures associated with the present invention. The processor and adapter may, in turn, comprise processing elements and/or logic circuitry configured to execute the software code and manipulate the data structures. It will be apparent to those skilled in the art that other processing and memory means, including various computer readable media, may be used for storing and executing program instructions pertaining to the inventive technique described herein.

A storage operating system 150, portions of which are typically resident in memory and executed by the processing elements, functionally organizes the system 100 by, inter alia, invoking storage operations executed by the storage system. The storage operating system implements a high-level module to logically organize the information as a hierarchical structure of directories, files and blocks on disks of an array. The operating system 150 further implements a storage module that manages the storage and retrieval of the information to and from the disks in accordance with write and read operations. It should be noted that the high-level and storage modules can be implemented in software, hardware, firmware, or a combination thereof.

Specifically, the high-level module may comprise a file system 160 or other module, such as a database, that allocates storage space for itself in the disk array and that controls the layout of data on that array. In addition, the storage module may comprise a disk array control system or RAID system 170 configured to compute redundant (e.g., parity) information using a redundant storage algorithm and recover from disk failures. The disk array control system ("disk array controller") or RAID system may further compute the redundant information using algebraic and algorithmic calculations in response to the placement of fixed data on the array. It should be noted that the term "RAID system" is synonymous with "disk array control system" or "disk array controller" and, as such, use of the term "RAID system" does not imply employment of one of the known RAID techniques. Rather, the RAID system of the invention employs the inventive semi-static parity distribution technique. As described herein, the file system or database makes decisions about where to place data on the array and forwards those decisions to the RAID system.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system having an on-disk format representation that is block-based using, e.g., 4 kilobyte (kB) WAFL blocks. However, it is expressly contemplated that any appropriate storage operating system including, for example, a write in-place file system may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable to perform a storage function in a storage system, e.g., that manages file semantics and may, in the case of a file server, implement file system semantics and manage data access. In this sense, the ONTAP software is an example of such a storage operating system implemented as a microkernel and including a WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

The storage adapter 128 cooperates with the storage operating system 150 executing on the system 100 to access information requested by a user (or client). The information may be stored on any type of attached array of writeable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks, such as HDD and/or DASD, of array 200. The storage adapter includes input/output (I/O) interface circuitry that couples to the disks over an I/O interconnect arrangement, such as a conventional high-performance, Fibre Channel serial link topology.

Storage of information on array 200 is preferably implemented as one or more storage "volumes" (e.g., VOL1-2 140) that comprise a cluster of physical storage disks, generally shown at 130 and defining an overall logical arrangement of disk space. Each volume is generally, although not necessarily, associated with its own file system. The disks within a volume/file system are typically organized as one or more groups, wherein each group is comparable to a RAID group. Most RAID implementations enhance the reliability/integrity of data storage through the redundant writing of data "stripes" across a given number of physical disks in the RAID group, and the appropriate storing of parity information with respect to the striped data.

Specifically, each volume 140 is constructed from an array of physical disks 130 that are divided into blocks, with the blocks being organized into stripes. The disks are organized as groups 132, 134, and 136. Although these groups are comparable to RAID groups, a semi-static distribution technique described herein is used within each group. Each stripe in each group has one or more parity blocks, depending on the degree of failure tolerance required of the group. The selection of which disk(s) in each stripe contains parity is not determined by the RAID configuration, as it would be in a conventional RAID-4 or RAID-5 array.

The present invention relates to the semi-static distribution technique that distributes parity across disks of an array. The inventive technique is preferably implemented by the RAID system 170 that, among other things, computes parity in stripes across the disks, distributes the parity among those stripes as described herein and reconstructs disks lost as a result of failure. The semi-static distribution technique does not require the participation of the file system 160 and, as such, is also suitable for deployment in RAID code embodied as, e.g., a RAID controller that may be internally or externally coupled to the storage system 100.

According to the technique, parity is distributed (assigned) across the disks of the array in a manner that maintains a fixed pattern of parity blocks among stripes of the disks. When one or more disks are added to the array, the semi-static technique redistributes parity in a way that does not require recalculation of parity or moving of any data is blocks. Notably, the parity information is not actually moved; the technique merely involves a change in the assignment (or reservation) for some of the parity blocks of each pre-existing disk to the newly added disk. For example, a pre-existing block that stored parity on, e.g., a first pre-existing disk, may continue to store parity; alternatively, a block on the newly added disk can be assigned to store parity for the stripe, which "frees up" the pre-existing parity block on the first disk to store file system data. Note that references to the file system data do not preclude data generated by other high-level modules, such as databases.

Figure 2:
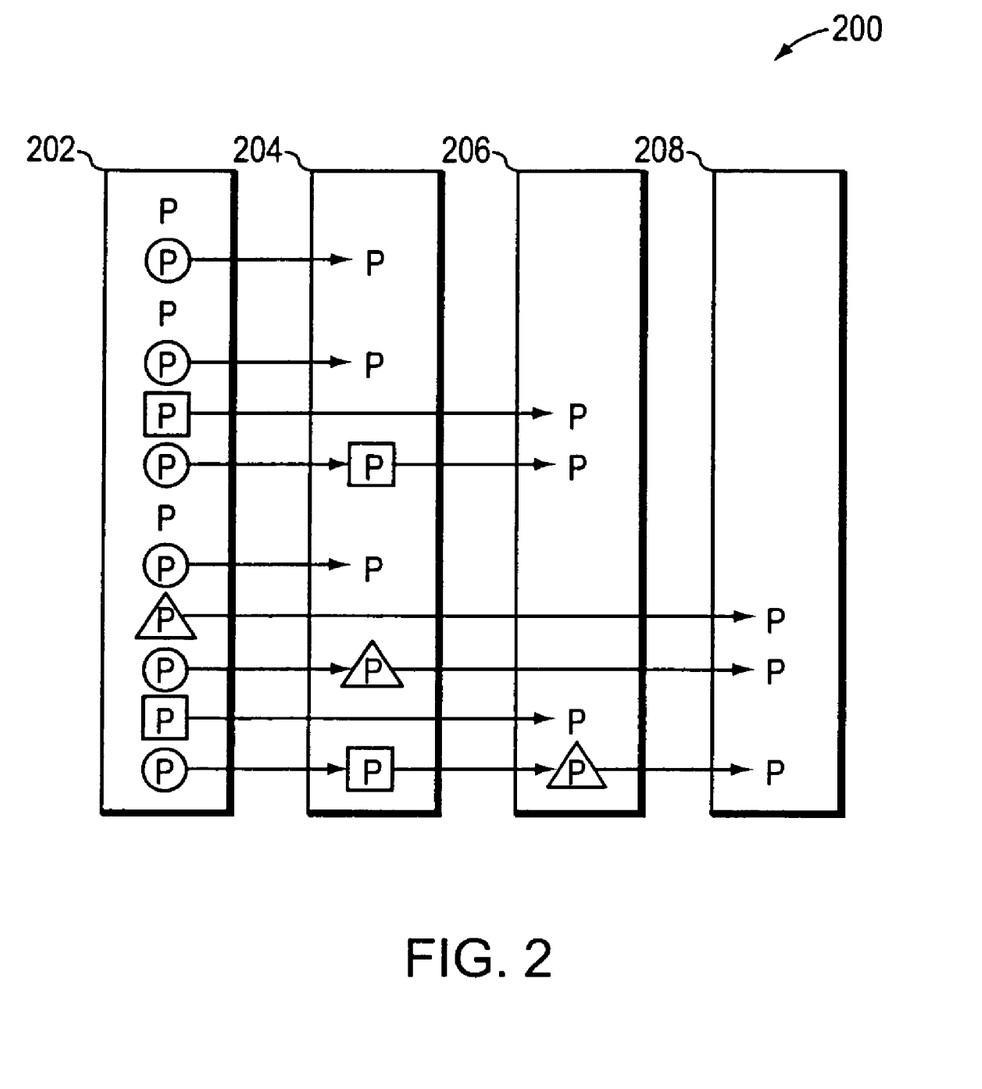
FIG. 2 is a schematic diagram of a disk array illustrating parity assignments according to a semi-static distribution technique of the present invention.

Assuming data is allocated densely across the disks of array 200, the storage operating system 150 can choose to assign parity evenly across the disks in a fixed pattern. However, the fixed pattern changes when one or more disks are added to the array. In response, the semi-static distribution technique redistributes (reassigns) parity in a manner that maintains a fixed pattern of parity blocks among the stripes of the disks. Note that each newly added disk is initialized to a predetermined and fixed value, e.g., zeroed, so as to not affect the fixed parity of the stripes. It should be further noted that the fixed parity may be even or odd, as long as the parity value is known (predetermined); the following description herein is directed to the use of even parity. In addition, initializing of the newly added disk allows reassignment of parity blocks in some stripes (e.g., 1/N of the stripes, where N is equal to the number of disks) to the new disk without any calculation or writing of parity.

According to the invention, the reassignment algorithm only ever changes a parity block to a data block and never changes a data block to a parity block. For example, in response to adding a new Nth disk to a group 132-136, the file system 160 can reassign every Nth parity block of each existing disk to the new disk. Such reassignment does not require any re-computation or data movement as the new disk only contains free blocks and parity blocks, so existing parity blocks can get reassigned for use for data, but not vice versa. This reassignment (construction) algorithm forms a pattern of parity that is deterministic for each group size and evenly distributes parity among all the disks in the group.

FIG. 2 is a schematic diagram of disk array 200 illustrating parity assignments according to the semi-static distribution technique of the present invention. Assume the array 200 initially comprises one disk 202 and it is desirable to store redundant (parity) information; therefore, each block on the disk stores parity (P) information. When a second disk 204 is added to expand the array, the parity blocks may be distributed between the two disks. Likewise, when a third disk 206 and, thereafter, a fourth disk 208 are added to the expanded array, the parity blocks may be distributed among those disks. As disks are added to the array 200, parity is not stored in a block that contains file system data. The semi-static distribution technique is directed to only reassigning parity blocks, which frees up blocks to use for data. In other words, the technique never reassigns a data block, which is in contrast to the expansion of conventional RAID-5 level implementations.

Parity may be distributed among the disks in accordance with a construction algorithm of the inventive technique that reassigns one of N parity blocks from each pre-existing disk to the new disk, wherein N is equal to the number of disks in the expanded array. Overall, one of N parity blocks is reassigned to the new disk, with each pre-existing disk continuing to hold exactly 1/N of the parity blocks in the expanded array. For a 2-disk array, every other parity block on the first disk 202 is moved to the second disk 204. When the third disk 206 is added to the expanded array 200, thereby creating a 3-disk array, every third remaining parity block on the first disk 202, as well as every third parity block on the second disk 204, is moved to the third disk 206. When the fourth disk 208 is added to the array, creating a 4-disk array, every fourth remaining parity block from each disk (disks 1-3) is moved to the fourth disk 208. As a result of this reassignment, the amount of parity on each disk is substantially the same. The location of the parity block also changes from stripe to stripe across the disks of the array in a predictable and deterministic pattern.

Figure 3:
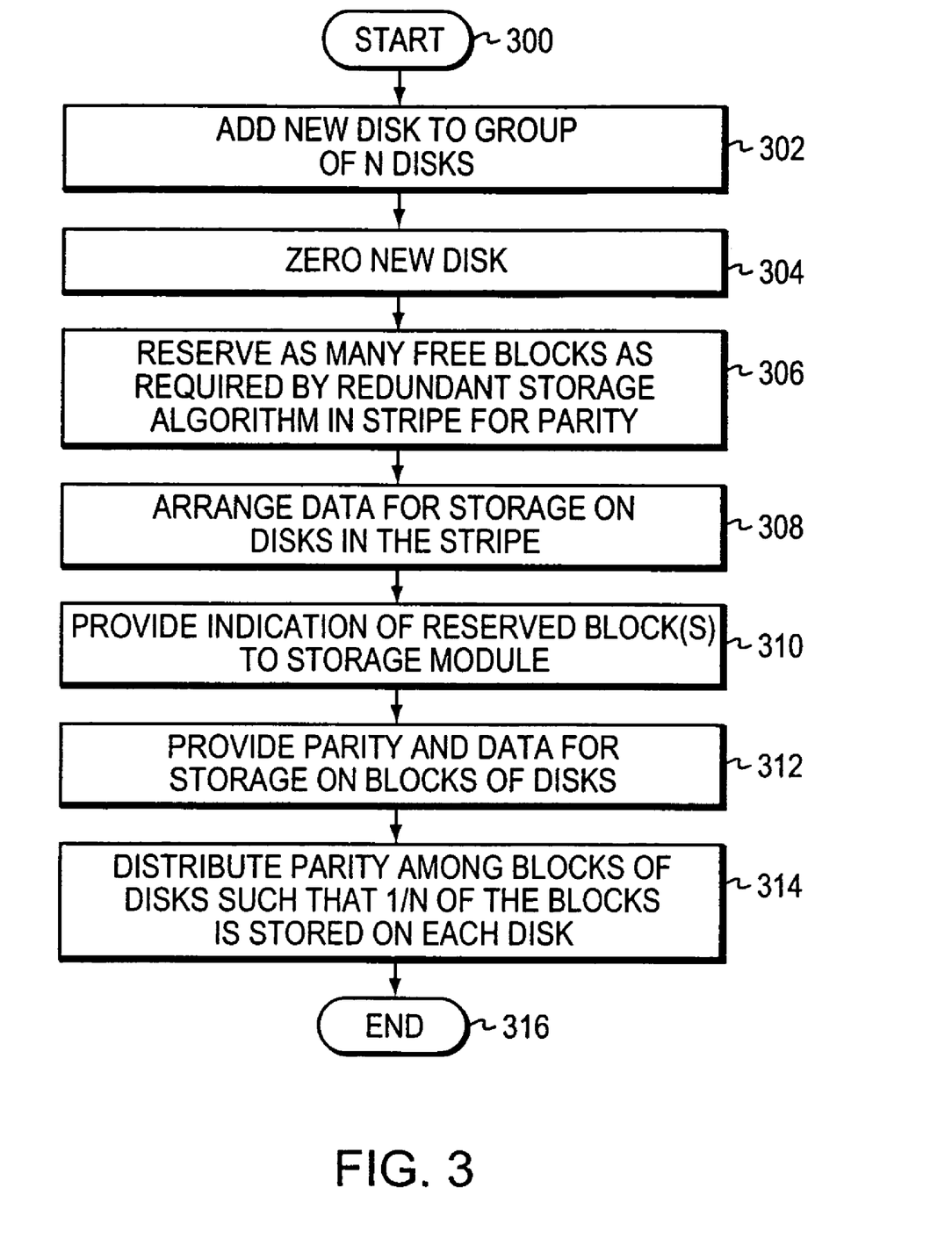
FIG. 3 is a flowchart illustrating a sequence of steps for distributing parity among disks of an array in accordance with an illustrative embodiment of the semi-static distribution technique.

FIG. 3 is a flowchart illustrating a sequence of steps for distributing parity among disks of an array in accordance with an illustrative embodiment of the semi-static distribution technique of the present invention. Here, a new Nth disk is added to a group 132-136 of the array and, as described above, one out of every N parity blocks is assigned to the new disk, wherein N is equal to the number of disks in the array. As noted, there is no need to actually move the parity information among the disks; the inventive semistatic distribution technique contemplates merely a change in the assignment (or reservation) for each parity block on the newly added disk.

The sequence starts in Step 300 and proceeds to Step 302 where the new disk is added to the group of N disks in the array. In Step 304, the new disk is initialized (e.g., zeroed) to ensure that the parity of the blocks on each stripe is unaffected. There may be multiple blocks within a stripe that do not contain data (i.e., unallocated data blocks) and that could potentially store parity. The stripe will contain at least one unallocated block, which is the parity block, and one or more unallocated blocks that are freed data blocks. All blocks contribute to, e.g., even parity, so the parity block(s) and the freed data blocks are all equivalent. The file system (or high-level module, if there is no file system) determines which disks contain free blocks in the stripe in response to a write request to store write data in the stripe. In Step 306, the file system 160 reserves as many free blocks as required by the redundant storage algorithm to store parity, arbitrarily. For example, a pre-existing block that stored parity on, e.g., a first pre-existing disk, may continue to store parity; alternatively, a block on the newly added disk can be assigned to store parity for the stripe, which "frees up" the pre-existing parity block on the first disk to store the data.

Note that any parity algorithm that protects against two (or more) disk failures may be used with the semi-static distribution technique, as long as the algorithm allows any two (or more) blocks in the stripe to store the parity. An example of a double failure correcting algorithm that may be advantageously used with the present invention is uniform and symmetric row-diagonal (SRD) parity described in U.S. patent application Ser. No. (112056-0141) titled *Uniform and Symmetric Double Failure Correcting Technique for Protecting against Two Disk Failures in a Disk Array*, by Peter F. Corbett et al. Here, the inventive technique is not dependent upon the uniformity or symmetry of the parity algorithm, although it can take advantage of it. When using a double failure correcting algorithm with the semi-static distribution technique, the file system reserves two unallocated data blocks to be assigned to store parity. A non-uniform double or higher failure correcting algorithm can be used since the location of the parity blocks is known deterministically. However, using such an algorithm may sacrifice the advantage that parity need not be recalculated when a disk is added to the array.

Another technique is to employ the non-uniform algorithm such that data blocks are written to any of the blocks of the array, even those that typically would be used to store redundant information. Since the multiple failure correcting algorithm can restore the contents of any missing disks, the remaining blocks can be used to store redundant information, even if they are constructed using the technique usually intended to reconstruct lost data blocks. Using a non-uniform algorithm in this way may result in an implementation that is much more complex than can be achieved by using a uniform and symmetric algorithm, such as SRD.

In Step 308, the write allocator 165 of the file system arranges the write data for storage on the disks in the stripe. In Step 310, the file system provides an indication of the reserved block(s) to the RAID system (storage module) via a write request message issued by the file system. In Step 312, the RAID system provides the parity information (and write data) to the disk driver system for storage on the disks. In particular, in Step 314, the parity is distributed among the blocks of the disks such that 1/N of the parity blocks is stored on each disk to thereby balance the data across the disks of the array. Moreover, the locations of the parity blocks "move" among the stripes of the array in a predictable pattern that appears complicated, but is easy to compute. The sequence then ends at Step 316.

Additional techniques by which a balanced semi-static distribution of redundant or parity blocks can be achieved in a double failure correcting array that has two redundant blocks per stripe includes a technique that simply replaces each single disk in a single failure correcting semi-static array with a pair of disks in the double failure correcting array. Here, the role of each pair of disks is identical to the role of the corresponding single disk in the single failure-correcting array. Balance is maintained by using the same number of rows used in the single failure-correcting array; however, this technique is limited to adding disks to the array in multiples of two.

Another technique constructs a balanced or nearly balanced array by starting with two initial ("old") disks that are completely filled with parity blocks, then adding a third disk and moving every third parity block from each of the two initial disks to the new disk. This technique distributes one-third of the parity blocks to each disk, occupying two-thirds of the space on each disk. When reassigning parity blocks from an old disk, it may be discovered that the block on the new disk has already been designated as parity. In this case, the next possible parity block is reassigned from the old disk to the new disk, at the next row where the new disk does not yet contain parity and the old disk does.

This latter technique can be further extrapolated to build a deterministic set of parity assignments for any number of disks, with two redundant (e.g., parity) blocks per stripe and with the redundant blocks balanced or nearly balanced across the array. Similarly, for three or greater numbers of redundant blocks per stripe, the same technique can be employed to determine a placement of redundant blocks in a larger array of any size, in such a way that the number of redundant blocks per disk is balanced or nearly balanced. Moreover, the technique allows any number of disks to be added without ever changing a data block into a parity block, while continuing to keep the number of redundant blocks per disk balanced or nearly balanced.

Other similar techniques can be developed to determine the roles of blocks as data blocks or redundant blocks in any size array, while preserving the property that the array can be expanded incrementally as the distribution of both data and redundant blocks are kept balanced or nearly balanced, and without ever changing a data block into a redundant block. Any of these assignment techniques can be implemented by storing or generating a data structure (e.g., a table) in memory containing the assignments for a specific number of rows in an array of specific size. It is also possible to store in a single table all possible assignments of redundant blocks for any array size up to a certain limit. Here, for example, the table may store a bitmap for each row, where the one (or more) highest numbered bit set is selected that is less than N, wherein N is the number of disks in the array. In general, any table-based parity assignment that maintains balance of distributed data and redundant blocks, while allowing expansion without changing data blocks to redundant (parity) blocks, is contemplated by the present invention, regardless of the number of redundant blocks per row (i.e., the number of failures the array can tolerate).

The parity assignments for the semi-static distribution technique are calculated for a known size of a group 132-136 of the disk array or for a maximum group size of the array; either way, as noted, the calculated parity assignments may be stored in a table. A parity distribution pattern defined by the stored assignments and, in particular, a repeat interval of the pattern can be used to determine the location of parity storage on any disk in the array for a given group size and for a given stripe. That is, the pattern can be used to indicate which block in each stripe is used for parity or a different pattern can be used for several stripes.

Figure 4:
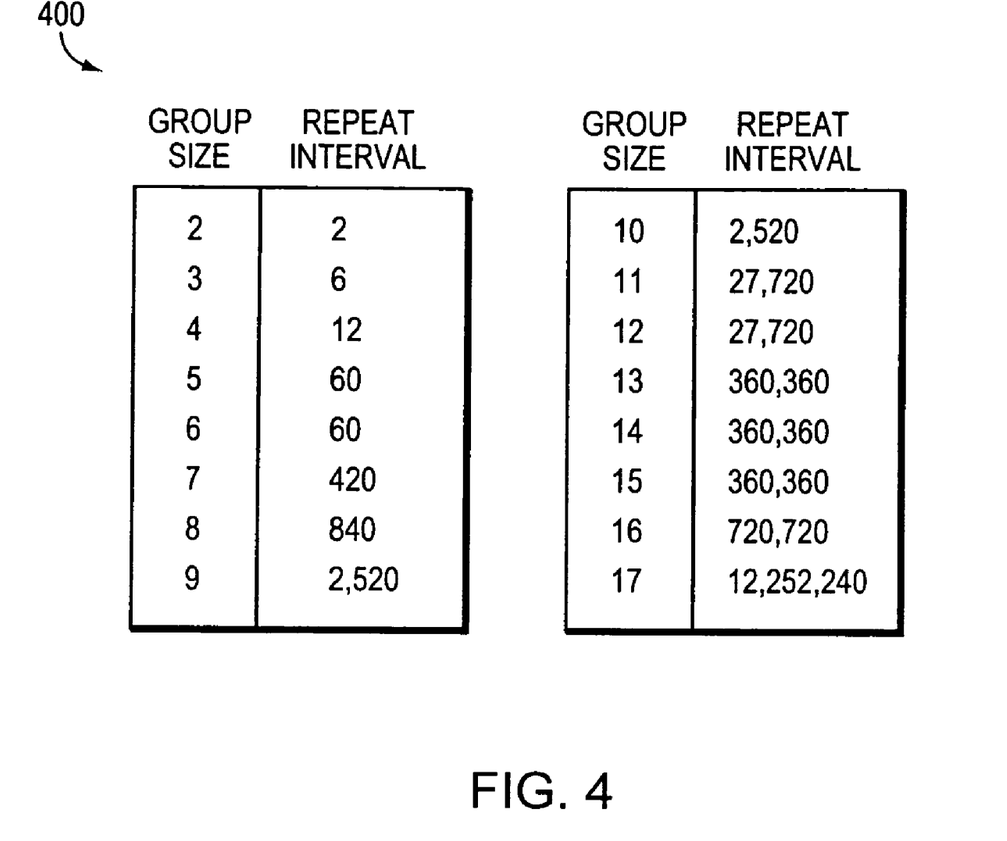
FIG. 4 is a diagram of a parity assignment table illustrating a repeat interval for various group sizes in accordance with the semi-static distribution technique.

FIG. 4 is a diagram of a parity assignment table 400 illustrating the repeat interval for various group sizes in accordance with the semi-static distribution technique. The parity distribution pattern repeats at a repetition interval dependent upon the group size of the array. If a group of size N repeats every K stripes then the group of size (N+1) will repeat in the smallest number that both K and (N+1) evenly divide. Notably, the content of the table does not repeat until it reaches a number (repeat interval) dependent on the value of N, where N equals the number of disks. For example, in a 2-disk array (i.e., a group size of two), the parity distribution pattern repeats every two stripes. When a third disk is added (for a group size of three), the parity pattern repeats every six stripes. When a fourth disk is added (for a group size of four), the parity pattern repeats every twelve stripes. It can be seen from table 400 that for a group size of five (and six), the parity pattern repeats every sixty stripes.

The repeat interval as a function of group size is determined in accordance with the set of unique prime factors ("primes") up to N, where N equals the number of disks. The repeat interval (which is equivalent to the number of entries in table 400) is less than N factorial and, in fact, is equal to the product of all primes less than or equal to N, with each prime raised to the largest power possible such that the result is less than or equal to N. As some of the numbers between one and N are prime numbers, it is clear that the repeat interval may get large, making the table large. For example, for N=10, the table size is $2^3 \times 3^2 \times 5^1 \times 7^1 = 8 \times 9 \times 5 \times 7 = 2520$. Similarly, for N=32, the table size is $2^5 \times 3^3 \times 5^2 \times 7^1 \times 11^1 \times 13^1 \times 17^1 \times 19^1 \times 23^1 \times 29^1 \times 31^1 = 32 \times 27 \times 25 \times 7 \times 11 \times 13 \times 17 \times 19 \times 23 \times 29 \times 31 \cong 144 \times 10^{12}$.

A tradeoff may then be made between the table size of the pattern and precision of balancing; the table can be terminated at a reasonable point and the group size at that particular repeat interval can be used. Thereafter, even if there are more disks than the group size, the technique can continue to repeat the pattern and still realize nearly uniform balance of data across the array within, e.g., a half percent. For example, as noted above, a group size of ten translates into a parity distribution pattern that repeats every 2,520 stripes. A table of this size (i.e., 2,520 entries) is relatively compact in memory 124 and can be computed relatively quickly at start-up using appropriate software code. In contrast, the table for a group size of 32 (i.e., $144 \times 10^{12}$ entries) is too large to store in memory.

The 2,520 entry table works well with any reasonable number of disks to provide good data balance; however, it should be noted that this size table is not the only choice and other sized tables may also be used. The 2,520 entry pattern is perfectly balanced for N disks up to ten; for N greater than 10, the pattern provides good data balance even though the pattern has not repeated. In other words, although the parity assignment table for a 17-disk group is rather large (7.7 MB with 5 bits per pattern), if only a fraction of the table is used, good parity balance can still be achieved. Cutting off the pattern at 2,520, for example, yields perfect balance for all group sizes up to 10 disks, and less than 1% imbalance to larger groups while limiting the table size to 2520×4 bits=1260 bytes for N=11 and 5×2520 bits=1,575 bytes for N=17 to 32.

The parity assignment table 400 can be encoded as a single number indicating a bit position of parity for a particular value of N. The table could also be coded as a bit vector, with one or two (or more) bits set indicating the position of a single or double (or greater) parity block providing single or double (or greater) disk failure protection. Moreover, the table can be encoded as a single table indicating (for all disk array sizes up to some limit, e.g., 32 disks) what disks possibly contain parity in each stripe. The determination of which disk actually contains parity for a specific value of N is then made by masking off the high order 32-N bits and selecting the highest order remaining one or two (or more) bits.

In sum, semi-static distribution strives to keep the number of data blocks per disk roughly matched across the array to thereby "spread" the read load across all disks of the array. As a result, the technique eliminates any "bottleneck" in the array caused by throughput of any single disk in the array, while also eliminating the parity disk(s) as hot spot(s) for write operations. The general technique can be applied using a symmetric algorithm, such as SRD parity, or an asymmetric double failure-correcting algorithm, such as Row-Diagonal (RD) parity. The RD parity technique is described in U.S. patent application Ser. No. 10/035,607 titled *Row-Diagonal Parity Technique for Enabling Efficient Recovery from Double Failures in a Storage Array*, by Peter F. Corbett et al., filed on Dec. 28, 2001.

When employing a non-uniform algorithm, such as RD parity, the role of the disk in storing either data or redundant blocks in any particular block might be ignored with respect to the typical role of the disk in the asymmetric parity algorithm. Since any double failure correcting algorithm can construct missing "data" for any two missing disks of an array, the contents of all the blocks in the row that are assigned the role of storing data are fixed and the contents of the two redundant blocks are computed using the double failure correcting algorithm, which is applied differently depending on the positions of the disks in the row. Having stored two redundant blocks in each row, the array can tolerate two disk failures, recovering the lost data or redundant blocks regardless of the roles of the lost blocks in any particular stripe.

Alternatively, since the roles of the disks are deterministically defined, any algorithm that allows any two or more disks in the array to contain the redundant information can be employed. Using such an algorithm may require the recomputation of parity in stripes where the parity blocks move, but it does preserve the advantage of the invention is that no data blocks are moved. SRD has the additional advantage that no parity blocks need be recomputed when parity block(s) are assigned to the newly added disk(s).

The distribution technique described herein is particularly useful for systems having fewer disks yet that want to utilize all read operations per second (ops) that are available from those disks. Performance of smaller arrays is bounded by the ops that are achievable from disks (disk-bound). Yet even in large arrays where disks get larger, because of reconstruction times, the tendency is to reduce the number of disks per group 132-136. This results in an increase in redundancy overhead (the percentage of disks in a group devoted to redundancy increases). Therefore, it is desirable to take advantage of the read ops available in those redundant disks. Another advantage of the distribution technique is that reconstruction and/or recovery occurs "blindly" (i.e., without knowing the roles of the disks).

Semi-static distribution may be advantageously used with arrays having low numbers of large disks, since the technique balances data across the array. Using larger disks is required to get reasonable capacity, but that also means using smaller groups to limit reconstruction time. If a 14-disk configuration uses two groups and one spare, then over 20% of the disks are unavailable for use in storing or retrieving data. Configurations with eight disks are even worse.

As noted, the semi-static distribution technique allows incremental addition of disks to a distributed parity implementation of a disk array. An advantage of the inventive distribution technique over a RAID-5 level implementation is that it allows easy expansion of the array, avoiding the need to add an entire group to the array or to perform an expensive RAID-5 reorganization. The semi-static distribution technique may be used in connection with single/double failure error correction. In addition, the technique allows use of multiple disk sizes in the same group 132-136.

While there has been shown and described illustrative embodiments of a semistatic distribution technique that distributes parity across disks, it is to be understood that various other adaptations and modifications may be made within the spirit and scope of the invention. For example, the distribution technique described herein may apply to block-based RAID arrays to, e.g., allow easy addition of disks to RAID groups. Block-based RAID arrays generally are not aware of which blocks they are asked to store contain file system data. Instead, the arrays must assume that all blocks not previously designated as parity blocks contain file system data. Therefore, they usually pre-allocate which blocks will be used for parity. For a given array, these pre-allocated blocks remain fixed. Normally this is done in some predetermined algorithm so that the system does not have to keep track of each parity block.

According to the invention, the RAID system may move the parity designation of some of the blocks in the existing disks to the new disks using the semi-static distribution technique. The RAID system must also ensure that logical unit number (lun) block off-sets of non-parity blocks in the existing disks are not changed. The new space will then be distributed among all the disks. This non-linear mapping is usually not desirable in block-based arrays, as file systems cannot compensate for it. However, this effect can be mitigated if the parity blocks are allocated contiguously in large chunks (e.g. at least a track size).

It will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 100. An example of a multi-protocol storage appliance that may be advantageously used with the present invention is described in U.S. patent application Ser. No. 10/215,917 titled, *Multi-Protocol Storage Appliance that provides Integrated Support for File and Block Access Protocols*, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The foregoing description has been directed to specific embodiments of this invention. It will be apparent, however, that other variations and modifications may be made to the described embodiments, with the attainment of some or all of their advantages. For instance, the semi-static distribution technique can be generalized to other applications involving the distribution of data structures among persistent storage, e.g., disks, or non-persistent storage, e.g., memory, of a system. Broadly, the technique may apply to the redistribution of any commodity over any set of containers as more containers are added to the system. As an example, the semi-static technique may apply to a system having units and containers, wherein the units are distributed uniformly over the containers and wherein it is desirable to maintain a balanced rate of assignment of units to containers along some numbered dimension. When a new container is added to the system, the technique may be employed to transfer some of the existing units to the new container in such a way that overall and localized balance is maintained.

More specifically, the semi-static technique can be applied to distribution of data structures, such as inode file blocks, among persistent storage devices, such as disks, of an array coupled to a plurality of storage entities, such as storage "heads". Note that a "head" is defined as all parts of a storage system, excluding the disks. An example of such an application involves distributing existing inode file blocks over the plurality of (N) storage heads, which includes one or more newly added storage heads. Here, the inventive semi-static distribution technique may be used to move only 1/N of any existing inode file blocks to the newly added storage head.

It is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for distributing parity blocks across a set of storage devices of a system, comprising:
    adding a new storage device to a set of pre-existing storage devices of the system to thereby provide N storage devices, where N is equal to number of pre-existing storage devices plus the new storage device; and
    moving every Nth parity block to the new storage device from the set of pre-existing storage devices to arrange approximately 1/N parity blocks on each storage device.

2. The method of claim 1, wherein the moving of parity blocks is accomplished without recalculation of parity blocks or moving of any blocks containing data.

3. The method of claim 1, further comprising:
    reassigning every Nth parity block to the new storage device.

4. The method of claim 1, further comprising:
    zeroing original locations of the parity blocks moved to the new storage device.

5. The method of claim 4, further comprising:
    storing data blocks in the original locations zeroed.

6. The method of claim 1, wherein the step of moving further includes:
    creating a fixed pattern of 1/N of parity blocks per a repeat interval.

7. The method of claim 6, wherein the fixed pattern is not a fixed rotating pattern through the set of storage devices.

8. The method of claim 1, wherein the step of moving comprises the step of changing an assignment for one or more blocks containing parity of each pre-existing storage device to the new storage device.

9. The method of claim 1, wherein the step of adding comprises the step of initializing the new storage device so as to not affect parity of the stripes.

10. A system to distribute parity blocks across a set of storage devices, comprising:
    the set of storage devices comprising a set of pre-existing storage devices and a new storage device to thereby provide N storage devices, where N is equal to number of pre-existing storage devices plus the new storage device; and
    a storage module configured to move every Nth parity block to the new storage device from the set of pre-existing storage devices to arrange approximately 1/N parity blocks on each storage device.

11. The system of claim 10, wherein the storage module is configured to move the parity blocks without recalculation of parity blocks or moving of any blocks containing data.

12. The system of claim 1, wherein the storage module is configured to reassign every Nth parity block to the new storage device.

13. The system of claim 10, wherein the storage module is configured to zero original locations of the parity blocks moved to the new storage device.

14. The system of claim 13, wherein the storage module is configured to store data blocks in the original locations zeroed.

15. The system of claim 10, wherein the storage module is configured to create a fixed pattern of 1/N of parity blocks per a repeat interval.

16. The system of claim 15, wherein the fixed pattern is not a fixed rotating pattern through the set of storage devices.

17. The system of claim 10, wherein the storage module is configured to initialize the new storage device so as to not affect parity of the stripes.

18. An apparatus for distributing parity blocks across a set of storage devices of a system, comprising:
    means for adding a new storage device to a set of pre-existing storage devices of the system to thereby provide N storage devices, where N is equal to number of pre-existing storage devices plus the new storage device; and
    means for moving every Nth parity block to the new storage device from the set of pre-existing storage devices to arrange approximately 1/N parity blocks on each storage device.

19. A computer readable medium containing executable program instructions for distributing parity blocks across a set of storage devices of a system, comprising:
    adding a new storage device to a set of pre-existing storage devices of the system to thereby provide N storage devices, where N is equal to number of pre-existing storage devices plus the new storage device; and moving every Nth parity block to the new storage device from the set of pre-existing storage devices to arrange approximately 1/N parity blocks on each storage device.

20. The computer readable medium of claim 19, wherein the moving of parity blocks is accomplished without recalculation of parity blocks or moving of any blocks containing data.

* * * * *